United States Patent
Noel et al.

(10) Patent No.: US 7,826,390 B2
(45) Date of Patent: Nov. 2, 2010

(54) METHOD AND APPARATUS FOR PROVIDING A DISTRIBUTED SUBSCRIBER LOAD DISTRIBUTION

(75) Inventors: Eric Noel, Holmdel, NJ (US); Mark Ratcliffe, Oakhurst, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 467 days.

(21) Appl. No.: 12/014,500

(22) Filed: Jan. 15, 2008

(65) Prior Publication Data
US 2009/0180381 A1    Jul. 16, 2009

(51) Int. Cl.
*H04L 12/26* (2006.01)
(52) U.S. Cl. .................. 370/252; 370/235; 370/395.41
(58) Field of Classification Search ......... 370/229–235, 370/252–253, 395.2–395.43
See application file for complete search history.

(56) References Cited

U.S. PATENT DOCUMENTS 5,282,202 A * 1/1994 Bernstein et al. ............ 370/468
2007/0195700 A1 * 8/2007 Katoh et al. ................ 370/235
2008/0181161 A1 * 7/2008 Gi Kim et al. .............. 370/312

* cited by examiner

*Primary Examiner*—Thai D Hoang

(57) ABSTRACT

A method and apparatus for providing a distributed subscriber load distribution in networks are disclosed. For example, the method receives capacity data from a plurality of devices, and measures a peak period volume for each of a plurality of registered user equipment that is registered with one of the plurality of devices. The method determines whether a peak period volume of the one device reaches an on-set threshold of the one device, and selects one or more of the plurality of registered user equipment if the on-set threshold of the one device is reached, where a sum of the peak period volumes of the selected one or more plurality of registered user equipment is larger than or equal to a volume of traffic that is in excess of the on-set threshold, or in excess of an off-set threshold of the one device. The method sends a request for the selected one or more plurality of registered user equipment to be re-registered in accordance with the capacity data received from the plurality of devices.

20 Claims, 4 Drawing Sheets

METHOD AND APPARATUS FOR PROVIDING A DISTRIBUTED SUBSCRIBER LOAD DISTRIBUTION

The present invention relates generally to communication networks and, more particularly, to a method and apparatus for providing subscriber load distribution in networks, e.g., packet networks, Internet Protocol (IP) networks, Voice over Internet Protocol (VoIP) networks, IP Multimedia Subsystem (IMS), Virtual Private Networks (VPN), etc.

BACKGROUND OF THE INVENTION

When a customer wishes to access a network service, e.g., a Voice over Internet Protocol (VoIP) service, the customer's User Equipment (UE) is registered with a host server, e.g., a server with a Serving-Call Session Control Function (S-CSCF). Current methods distribute UEs across multiple servers with an S-CSCF function at registration time with no regard to the offered load. A UE may be re-registered on another S-CSCF server only under an exceptional condition, such as a network element failure. As such, call volumes may not be balanced across multiple S-CSCF servers.

SUMMARY OF THE INVENTION

In one embodiment, the present invention discloses a method and apparatus for providing a distributed subscriber load distribution within a network. For example, the method receives capacity data from a plurality of devices that process call control signaling messages within the communication network, and measures a peak period volume for each of a plurality of registered user equipment that is registered with one of the plurality of devices. The method determines whether a peak period volume of the one device exceeds or reaches an on-set threshold of the one device, and selects one or more of the plurality of registered user equipment if the on-set threshold of the one device is reached or exceeded, where a sum of the peak period volumes of the selected one or more plurality of registered user equipment is larger than or equal to a volume of traffic that is in excess of the on-set threshold, or in excess of an off-set threshold of said one device. The method sends a request for the selected one or more plurality of registered user equipment to be re-registered to at least another one device of the plurality of devices in accordance with the capacity data received from the plurality of devices.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing distributed subscriber load distribution within a network. Although the present invention discussed below is within the context of packet networks, e.g., Internet Protocol (IP) networks, the present invention is not so limited. Namely, the present invention can be applied to other packet networks and the like.

Figure 1:
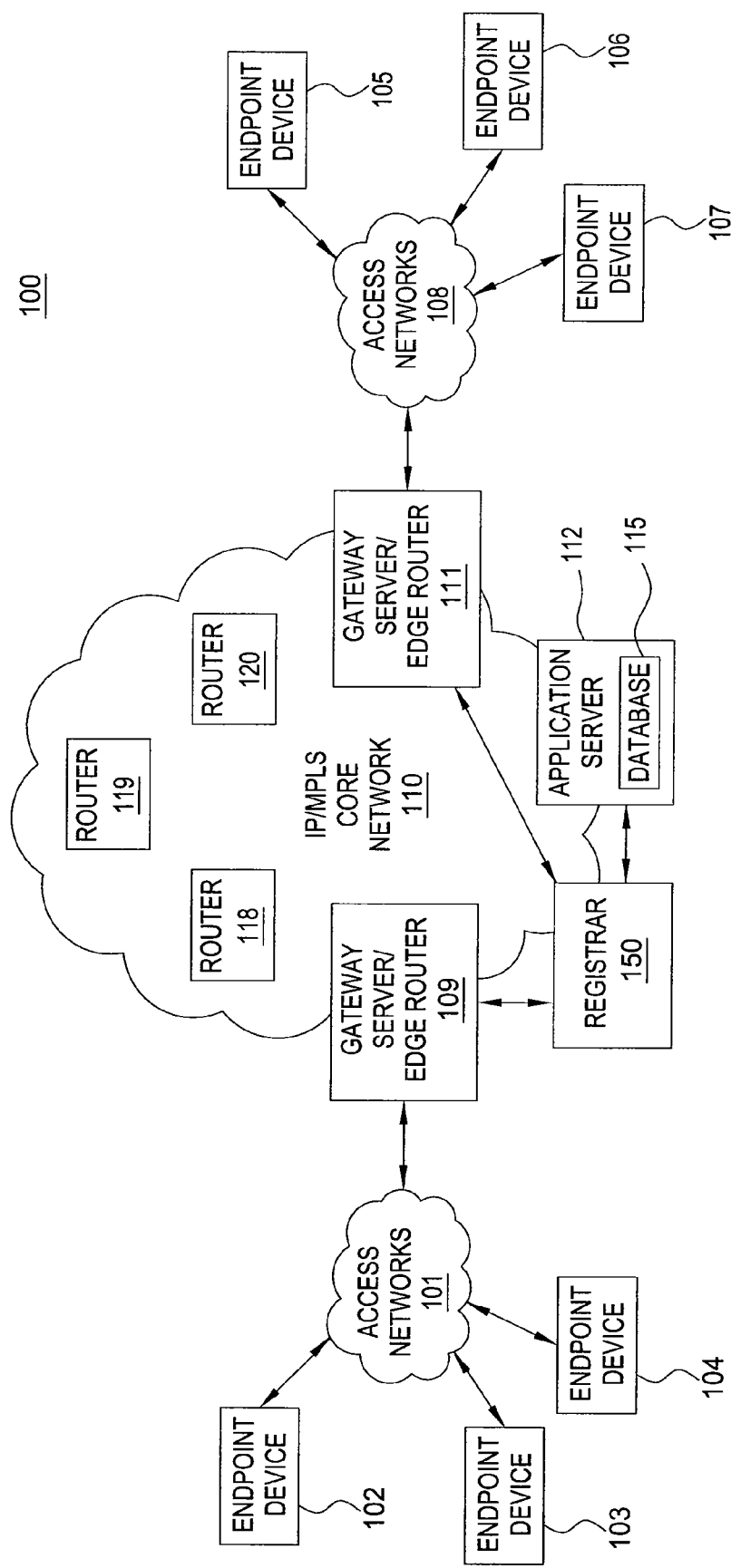
FIG. 1 illustrates an exemplary network related to the present invention.

FIG. 1 is a block diagram depicting an exemplary packet network 100 related to the current invention. Exemplary packet networks include Internet protocol (IP) networks, Ethernet networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers for the network 110.

In one embodiment, a registrar 150 is illustrated in network 110. The registrar 150 broadly encompasses a Serving-Call Session Control Function (S-CSCF), e.g., as implemented on a server. It should be noted that a plurality of registrars (not shown) can be deployed in the network 110. In operation, a user endpoint will be registered to one registrar among a plurality of registrars within network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five routers, one registrar and so on are depicted in FIG. 1, the communication system 100 may be expanded by including additional endpoint devices, access networks, border elements, routers, registrars, etc. without altering the present invention.

The above IP network is described to provide an illustrative environment in which packets for voice and data services are transmitted on networks. When a UE registers with a registrar, e.g. Serving-Call Session Control Function (S-CSCF), the amount of load to be produced by the UE is often unknown. The registration is performed independent of the load that will be produced. As such, call volumes may not be balanced across multiple S-CSCF functions and may contribute to S-CSCF overload. When an S-CSCF is overloaded, calls are dropped, thereby resulting in customer dissatisfaction with the subscribed service and loss of revenue for the service provider.

For example, a UE may be an Internet Protocol-Private Branch Exchange (IP-PBX) servicing a call center that handles calls terminating to a toll-free number. The capacity of the server providing the S-CSCF function to the UE may limit the throughput of the UE. As a result, the IP-PBX servicing the toll-free number may have a capacity need that cannot be sufficiently met by the S-CSCF server with whom the IP-PBX has registered with during an initial registration process.

In one embodiment, the current method provides a centralized load distribution method or algorithm that enables a load managing server, e.g., a Home Subscriber Server (HSS) to periodically redistribute registered UEs to different S-CSCFs. To better understand the current invention, the following networking terminology will first be provided:

a) Home Subscriber Server (HSS); and
b) Serving-Call Session Control Function (S-CSCF).

Home Subscriber Server (HSS) refers to a server with a database for storing user data, e.g., registration status, the S-CSCF that serves the user, the service profile associated with the user, etc., required by a core network to fulfill its duties. The HSS also performs authentication and authorization of the user and may provide information about the location of the user.

Serving-Call Session Control Function (S-CSCF) is the central node of the signaling plane for performing session control and the SIP registrar function binding the UE to the S-CSCF. Broadly defined, an S-CSCF processes call control signaling messages. In one embodiment, it can be implemented as a registrar or a Session Initiation Protocol (SIP) server. For example, the S-CSCF is located in the network and interfaces with the HSS to download and upload user profiles. In one embodiment, the S-CSCF has no local storage of the user data. All necessary information is loaded from the HSS. The S-CSCF sits on the path of all signaling messages, and can inspect every message to decide to which application server(s), if applicable, and to the next server a SIP message is to be forwarded.

Figure 2:
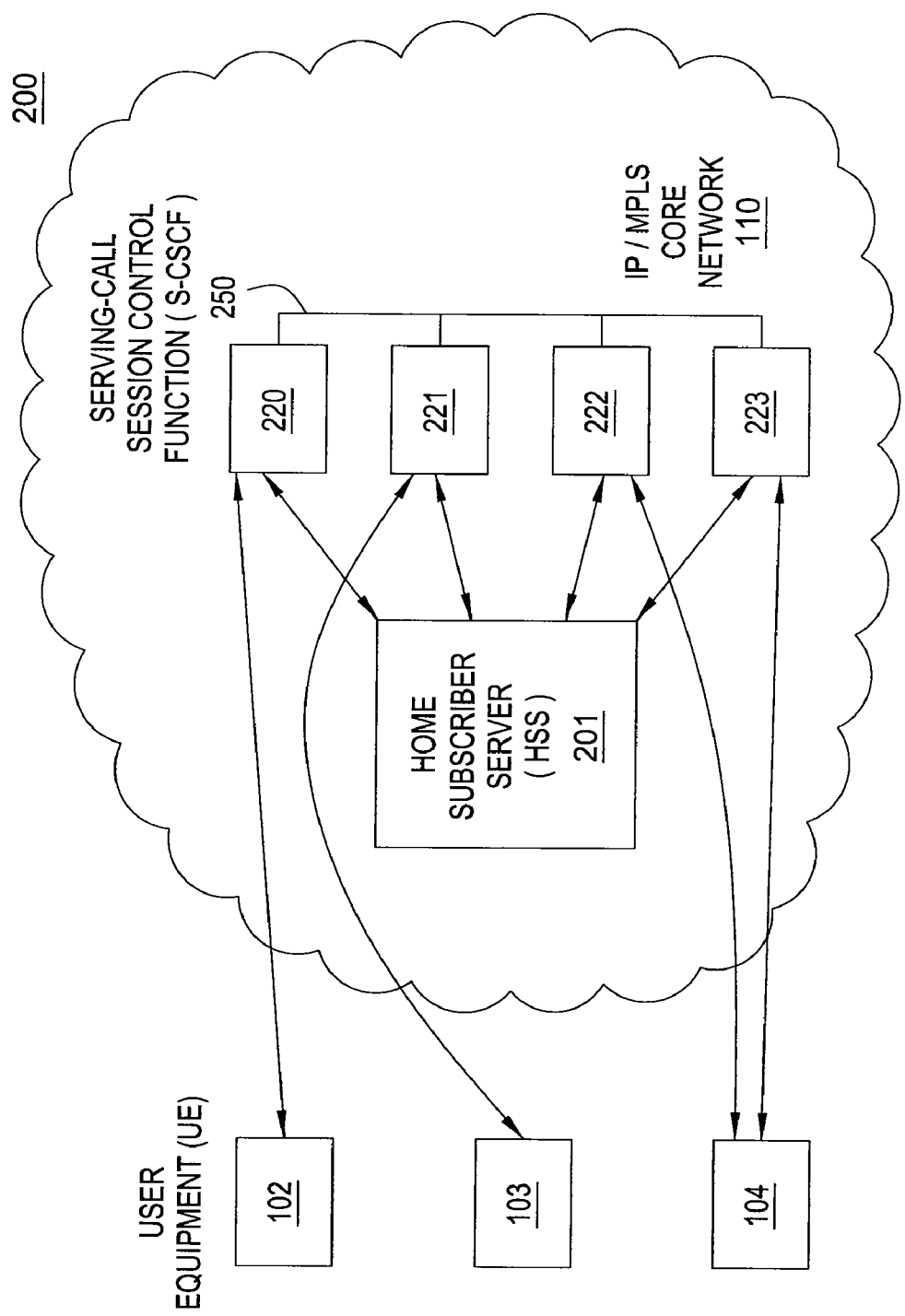
FIG. 2 illustrates an exemplary network with the current invention for providing subscriber load distribution.

FIG. 2 illustrates an exemplary network 200 of the current invention for providing distributed subscriber load distribution. For example, user Equipment (UEs) 102-104 are accessing services from IP/MPLS core network 110. The UEs are in communication with an HSS 201 via a plurality of S-CSCFs 220-223 for registering and accessing subscribed services. The HSS 201 selects one of the S-CSCFs 220-223 for each UE and enables the UEs to register with one of the assigned S-CSCFs 220-223. For example, UE 102 may be registered on S-CSCF 220, while UE 103 is registered on S-CSCF 221 and so on. Furthermore, each UE (e.g., UE 104) may have the capability to communicate with more than one S-CSCF. Again, it should be noted that the number of UEs, S-CSCFs, and HSS shown in FIG. 2 is only illustrative and should not be interpreted as a limitation of the present invention.

In one embodiment, the current invention enables each S-CSCF server to periodically measure and track the capacity of other S-CSCF resources. An S-CSCF server may determine the capacity of other S-CSCF servers by querying each peer S-CSCF server or via a broadcasting mechanism. For example, the queries may pass through the HSS or the S-CSCF servers may use a shared path or bus 250.

In one embodiment, the S-CSCF servers in a network may broadcast their capacity data to all other S-CSCF servers. For example, each S-CSCF server may maintain a broadcast list containing its peer S-CSCF servers. The S-CSCF servers may then periodically broadcast their own capacity data.

In another embodiment, the S-CSCF servers in a network may send their capacity data to a master S-CSCF server, HSS or another SIP server. The master S-CSCF server, HSS or another SIP server may then maintain a broadcast list and distribute the capacity information accordingly.

Each S-CSCF also periodically measures and tracks the S-CSCF resource consumption for each registered UE. For example, the method may track the number of calls, number of packets, length of calls, etc. for each registered user.

The S-CSCF server may then track: the capacity of other S-CSCF servers (e.g., expressed as a percentage of the maximum capacity of each S-CSCF), the peak period volume per registered UE, and the peak period volume per S-CSCF server. For example, an S-CSCF server may determine the peak volume for each of a plurality of registered UEs that it is currently servicing, the cumulative peak volume for all S-CSCF servers (including itself), and/or the capacity of each S-CSCF server. The analysis or measurements can be made on a predetermined time interval, e.g., on a 0.5 hour basis, on an hour basis, and so on.

In one embodiment, the service provider determines the peak period length for tracking capacity of the S-CSCF servers and/or tracking of the capacity consumption by the UEs. The appropriate period of time depends upon the type of service. For example, for uniform services with Poisson distributed arrivals, 1-hour may be used. For services with bursty arrivals, a shorter period of time such as 5 minutes may be needed. For example, teleconferencing services may be grouped at fixed time periods and may have arrival times that are bursty.

In one embodiment, the S-CSCF is able to detect when its peak period volume is exceeded in accordance with a predefined threshold. An S-CSCF may have one or more thresholds for triggering load re-distribution, e.g., an on-set threshold, an off-set threshold, an overload threshold, a maximum capacity threshold, etc.

In one embodiment, the maximum capacity refers to an S-CSCF's capacity beyond which the S-CSCF will no longer be able to process an additional transaction, and in fact, may start an overload method or algorithm, e.g., selectively dropping packets, dropping set-up messages, and the like. An overload threshold for an S-CSCF refers to a threshold that is set to activate an overload method or algorithm so as to prevent the S-CSCF from reaching or exceeding its maximum capacity. For example, the overload method may activate various remedial steps, e.g., triggering a warning message to a customer or to the service provider, requesting additional resources, requesting re-direction of traffic, and the like.

In one embodiment, an on-set threshold for an S-CSCF refers to a threshold used to decide when a load balancing method or algorithm is to be invoked. In contrast, an S-CSCF also has an off-set threshold used to terminate a redistribution of load process, i.e., to terminate the load balancing algorithm. The use of the on-set threshold in conjunction with the off-set threshold will reduce oscillations where UEs are constantly being re-registered with different S-CSCFs. For example, the on-set threshold is set to a larger value than the off-set threshold, but both thresholds are set below the overload threshold. As such, when a load balancing method is triggered after exceeding the on-set threshold, the load balancing method will continue to be in effect until the off-set threshold is reached. Namely, the load balancing method will not terminate when the measured traffic volume falls below the on-set threshold. Thus, the load balancing method will be triggered before the overload threshold of the S-CSCF is reached.

It should be noted that the various thresholds can be set based upon a percentage of the maximum capacity of an S-CSCF. For example, an overload threshold can be set at 90% of the maximum capacity. Similarly, an on-set threshold can be set at 80% of the maximum capacity and an off-set threshold can be set at 70% of the maximum capacity. It should be noted that the values set for these various thresholds can be selectively set by a service provider depending on the requirements of a particular application or through the collection of statistics over a period of time.

In one embodiment, a particular S-CSCF may have detected that a peak period volume may have exceeded its on-set threshold. As part of the load balancing method, the S-CSCF may select one or more UEs whose cumulative peak period volume is larger than or equal to the volume of traffic in excess of the on-set threshold. It should be noted that for some network scenarios, selecting candidate UEs for a move to other S-CSCFs based on consumption may not be practical. For example, a UE for a customer may be selected repeatedly for re-registration to other S-CSCFs. In one embodiment, the frequency of moving the same UEs from one S-CSCF to another may be reduced by using a random selection mechanism. For example, the current method may use a random selection algorithm to select candidate UEs for load redistribution.

For example, the method may randomly select a list of candidate UEs that has been reported by an S-CSCF. The method may then sum the peak period volumes of the selected UEs. If the sum of the peak period volumes of the selected UEs is less than the volume of traffic in excess of the on-set threshold (or alternatively the off-set threshold), then the method adds more candidate UEs. The process continues until the sum is greater than or equal to the traffic in excess of the on-set threshold (or alternatively the off-set threshold).

In one embodiment, for each selected UE, the S-CSCF will select an available S-CSCF whose peak period volume plus that of the UE is less than or below the off-set threshold volume. Thus, the S-CSCF is able to individually determine to which new one or more S-CSCFs the one or more selected registered UEs should be redistributed to. For example, for each selected registered UE, the method may randomly identify a new S-CSCF among the S-CSCFs, whose off-set threshold would not be exceeded after registering the UE. For example, there may be 10 S-CSCFs with available capacity but there may be only one S-CSCF that would not exceed its off-set threshold after registering the selected UE. Thus, in this example, the only S-CSCF that meets the criteria is selected.

Alternatively, the S-CSCF may select an available S-CSCF whose peak period volume plus that of the UE is less than or below the on-set threshold volume for the S-CSCF instead of the off-set threshold volume for the S-CSCF. Namely, if the number of available S-CSCFs is limited, then using the off-set threshold may be too stringent. In another embodiment, a 2 phase approach can be implemented, e.g., first selecting an S-CSCF such that the cumulative peak volume plus that of the UE is less than or below the off-set threshold of the selected S-CSCF, but if such S-CSCF is not found, then selecting an S-CSCF such that the cumulative peak volume plus that of the UE is less than or below the on-set threshold.

In one embodiment, the S-CSCF initiating the redistributing of the load will notify the Home Subscriber Server (HSS) to re-register the one or more selected registered UEs to the new S-CSCFs. For example, the S-CSCF may notify the HSS to which new S-CSCF to re-register each of the selected UEs when either idle, after some predefined time period or immediately.

The HSS then re-registers or causes each of the selected one or more UEs to be re-registered to the selected S-CSCF. Those skilled in the art will realize that the re-registering process of the selected UE onto a new S-CSCF implies a de-registration process from the previous S-CSCF has occurred.

In one embodiment, the HSS re-registers a UE when the session is idle. For example, the HSS waits until the termination of the established sessions before performing de-registration of the UE with the current S-CSCF and re-registration with the new S-CSCF. In one embodiment, the HSS subscribes to the S-CSCF to be notified when the UE is idle. For example, if an HSS receives a request from a first S-CSCF to move a randomly selected UE to another S-CSCF, then the HSS will subscribe with the first S-CSCF to be notified when the selected UE is idle. The HSS is then able to determine when the UE has no active sessions and to perform the re-registration without any service impact to the selected UE. Thus, the HSS may re-register a UE only after a pre-provisioned period of time, e.g., based on average call hold time of the UE as monitored by the S-CSCF, based on the time of day, based on a predefined period of time, and so on.

In one alternate embodiment, re-registration may occur immediately regardless of whether or not there are one or more active sessions. For example, the reported volume for the UE is such that re-registration should be performed immediately to minimize service impact to that particular customer and/or to other customers serviced by the same S-CSCF.

In one embodiment, the network service provider selectively determines when the re-registration is allowed, e.g., upon termination of active calls, immediately or after a predetermined time elapses. This allows the service provider the flexible control in dictating when and how re-registration will be implemented.

In one embodiment, the capacity data is sent to an S-CSCF using a standard information exchange protocol, e.g., using a Session Initiation Protocol (SIP) INFO. Thus, the present invention can be implemented using an existing communication protocol.

Figure 3:
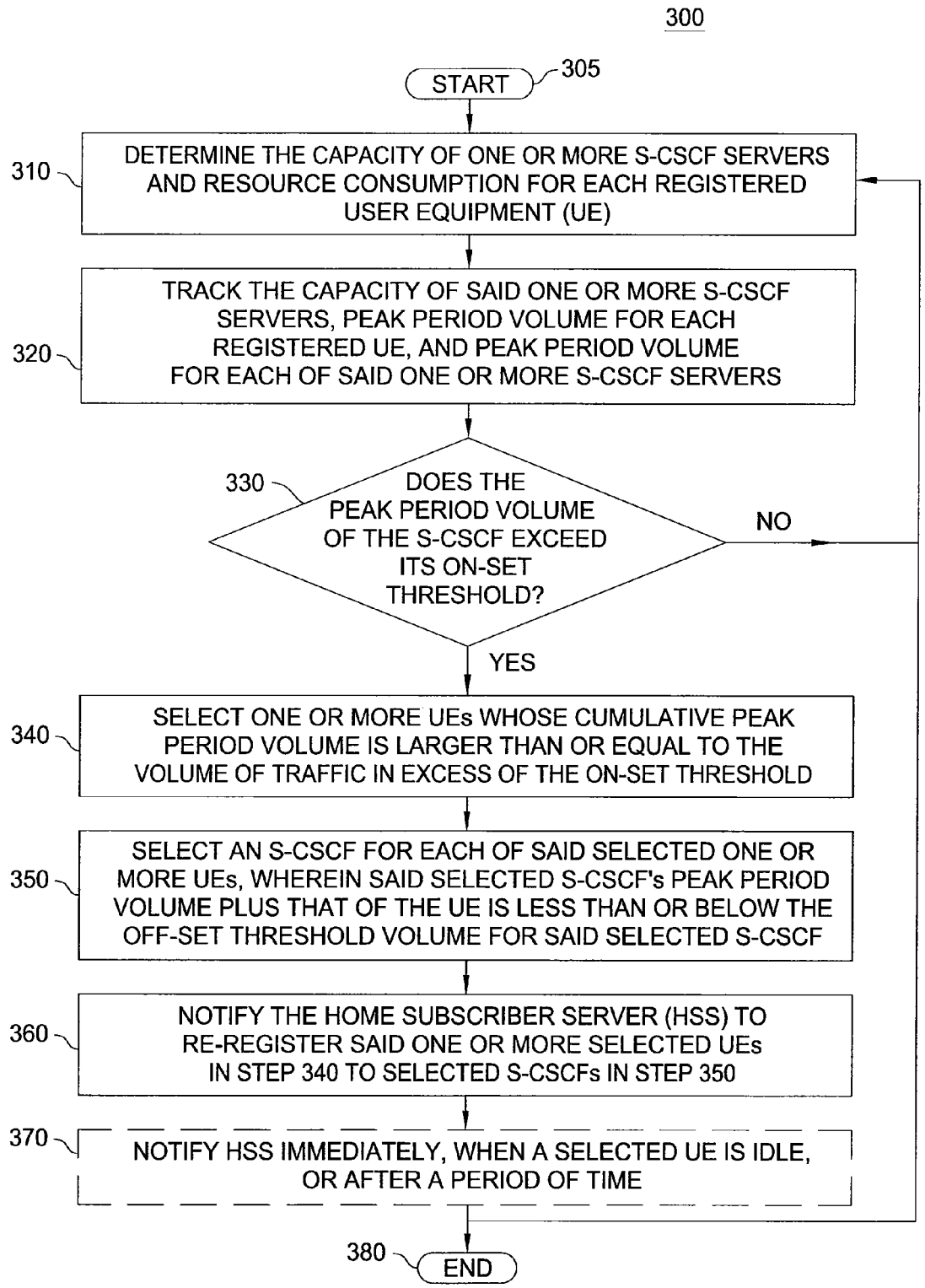
FIG. 3 illustrates a flowchart of a method for providing subscriber load distribution in networks.

FIG. 3 illustrates a flowchart of a method 300 for providing distributed subscriber load distribution. For example, method 300 can be implemented by an S-CSCF server. Method 300 starts in step 305 and proceeds to step 310.

In step 310, method 300 determines the capacity of one or more S-CSCF servers and the resource consumption for each registered User Equipment (UE), e.g., periodically. In one embodiment, the S-CSCF servers may periodically broadcast their own capacity data to all other S-CSCF servers. For example, each S-CSCF server may maintain a broadcast list containing its peer S-CSCF servers. In another embodiment, the S-CSCF servers in a network may send their capacity data to a master S-CSCF server, HSS or another SIP server. In turn, the master S-CSCF server, HSS or another SIP server may then maintain a broadcast list and distributes the capacity information in accordance with the broadcast list.

In step 320, method 300 tracks the capacity of the one or more S-CSCF servers, the peak period volume for each registered UE, and the peak period volume for each of the one or more S-CSCF servers, e.g., over a pre-determined peak period length. For example, an S-CSCF server may determine peak volume for each registered UE, the peak volume for each S-CSCF server, and the availability of each S-CSCF server for a pre-determined peak period length such as every 15 minutes, every 30 minutes, every hour, and so on.

In step 330, method 300 determines whether or not the peak period volume of an S-CSCF server exceeds the on-set threshold for the S-CSCF server. For example, each S-CSCF server is provided with an on-set threshold. If the peak period volume exceeds the on-set threshold, then the method proceeds to step 340. Otherwise, the method proceeds back to step 310.

In step 340, method 300 selects one or more UEs whose cumulative peak period volume is larger than or equal to the volume of traffic in excess of the on-set threshold. For example, the method may randomly select a list of candidate UEs. The method may then sum the peak period volumes of the selected UEs. If the sum of the peak period volumes of selected UEs is less than the volume of traffic in excess of the on-set threshold, then the method adds more candidate UEs. The process continues until the sum is greater than or equal to the traffic in excess of the on-set threshold.

Alternatively, in step 340, method 300 may select one or more registered UEs whose cumulative peak period volume is larger than or equal to the volume of traffic in excess of the off-set threshold. This will likely redirect more UEs from the current overloaded S-CSCF, thereby reducing the need of having to redirect additional UEs from the current S-CSCF.

It should be noted that various alternative UE selection methods can also be employed. For example, one alternative method may rank order the UEs based on their peak period volume and then selecting the xth highest UEs such that the cumulative peak period is equal to or larger than the excess traffic. Another alternative method may rank order the UEs based on historical trending of UE resource consumption and then selecting the xth highest UEs such that the cumulative peak period is equal to or larger than the excess traffic, etc.

In step 350, method 300 selects an S-CSCF for each of the selected one or more UEs, wherein the selected S-CSCF's peak period volume plus that of the UE is less than (e.g., below) the off-set threshold volume for the selected S-CSCF. For example, for each selected registered UE, the method may randomly identify a new S-CSCF among S-CSCFs whose off-set threshold would not be exceeded after re-registering the UE. This step will continue until all of the one or more selected UEs for re-registrations have been reassigned to one or more other S-CSCFs. If there are no S-CSCFs with available capacity then the UE(s) will not be moved. Alternatively, the method may select an available S-CSCF, for each of the one or more selected UEs, whose peak period volume plus that of the selected UE's is less than (e.g., below) the on-set threshold volume for the available S-CSCF.

In step 360, method 300 notifies the Home Subscriber Server (HSS) to re-register the one or more selected UEs determined in step 340 to the selected S-CSCFs determined in step 350. For example, the S-CSCF may notify the HSS to which new S-CSCF to re-register each of the selected UEs.

In optional step 370, method 300 may notify the HSS when a selected UE is idle, after a pre-defined time period or immediately. For example, the method may have requested to move a first UE to another S-CSCF. However, the UE may have had one or more active sessions while the request was sent. Optionally, the HSS may have requested to be notified when the UE has no active sessions, i.e., when the UE is idle. Method 300 then ends in step 380 or returns to step 310.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
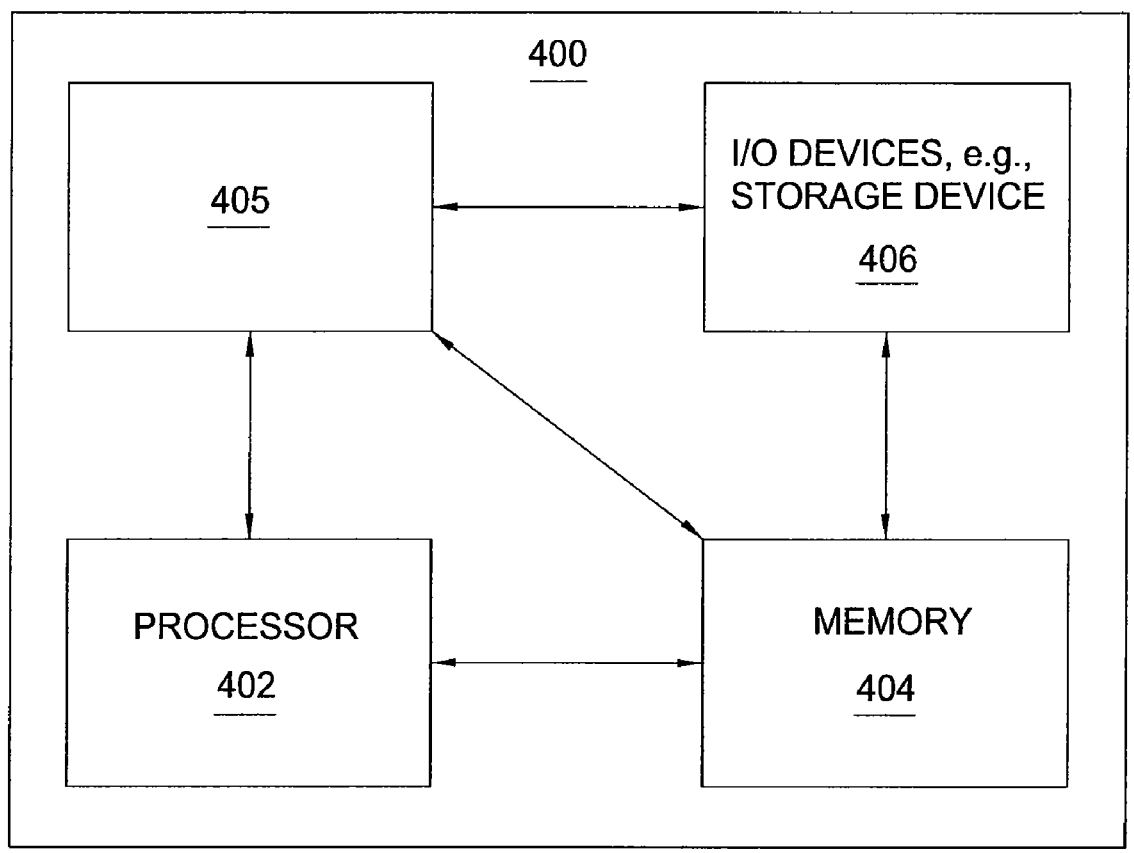
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing distributed subscriber load distribution (e.g., implementing method 300 as discussed above), and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing distributed subscriber load distribution can be loaded into memory 404 and executed by processor 402 to implement the functions as discussed above. As such, the present method 405 for providing distributed subscriber load distribution (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing distributed subscriber load distribution in a communication network, comprising:

receiving capacity data from a plurality of devices that process call control signaling messages within said communication network;

measuring a peak period volume for each of a plurality of registered user equipment that is registered with one of said plurality of devices;

determining whether a peak period volume of said one device exceeds or reaches an on-set threshold of said one device;

selecting one or more of said plurality of registered user equipment if said on-set threshold of said one device is reached or exceeded, where a sum of the peak period volumes of said selected one or more plurality of registered user equipment is larger than or equal to a volume of traffic that is in excess of said on-set threshold, or in excess of an off-set threshold of said one device; and sending a request for said selected one or more plurality of registered user equipment to be re-registered to at least another one device of said plurality of devices in accordance with said capacity data received from said plurality of devices.

2. The method of claim 1, wherein each of said plurality of devices performs a Serving-Call Session Control Function (S-CSCF).

3. The method of claim 1, wherein said request is sent to a Home Subscriber Server (HSS).

4. The method of claim 3, further comprising:
notifying said Home Subscriber Server when one of said one or more of said plurality of registered user equipment is idle.

5. The method of claim 1, wherein said one or more of said plurality of registered user equipment are selected in accordance with a random selection algorithm.

6. The method of claim 1, wherein each of said one or more of said plurality of registered user equipment is re-registered after all established sessions on each of said one or more of said plurality of registered user equipment are terminated.

7. The method of claim 1, wherein each of said one or more of said plurality of registered user equipment is re-registered immediately.

8. The method of claim 1, wherein each of said one or more of said plurality of registered user equipment is re-registered after a predefined time period.

9. A computer-readable medium having stored thereon a plurality of instructions, the plurality of instructions including instructions which, when executed by a processor, cause the processor to perform the steps of a method for providing distributed subscriber load distribution in a communication network, comprising:
receiving capacity data from a plurality of devices that process call control signaling messages within said communication network;
measuring a peak period volume for each of a plurality of registered user equipment that is registered with one of said plurality of devices;
determining whether a peak period volume of said one device exceeds or reaches an on-set threshold of said one device;
selecting one or more of said plurality of registered user equipment if said on-set threshold of said one device is reached or exceeded, where a sum of the peak period volumes of said selected one or more plurality of registered user equipment is larger than or equal to a volume of traffic that is in excess of said on-set threshold, or in excess of an off-set threshold of said one device; and
sending a request for said selected one or more plurality of registered user equipment to be re-registered to at least another one device of said plurality of devices in accordance with said capacity data received from said plurality of devices.

10. The computer-readable medium of claim 9, wherein each of said plurality of devices performs an Serving-Call Session Control Function (S-CSCF).

11. The computer-readable medium of claim 9, wherein said request is sent to a Home Subscriber Server (HSS).

12. The computer-readable medium of claim 11, further comprising:
notifying said Home Subscriber Server when one of said one or more of said plurality of registered user equipment is idle.

13. The computer-readable medium of claim 9, wherein said one or more of said plurality of registered user equipment are selected in accordance with a random selection algorithm.

14. The computer-readable medium of claim 9, wherein each of said one or more of said plurality of registered user equipment is re-registered after all established sessions on each of said one or more of said plurality of registered user equipment are terminated.

15. The computer-readable medium of claim 9, wherein each of said one or more of said plurality of registered user equipment is re-registered immediately.

16. The computer-readable medium of claim 9, wherein each of said one or more of said plurality of registered user equipment is re-registered after a predefined time period.

17. An apparatus for providing distributed subscriber load distribution in a communication network, comprising:
means for receiving capacity data from a plurality of devices that process call control signaling messages within said communication network;
means for measuring a peak period volume for each of a plurality of registered user equipment that is registered with one of said plurality of devices;
means for determining whether a peak period volume of said one device exceeds or reaches an on-set threshold of said one device;
means for selecting one or more of said plurality of registered user equipment if said on-set threshold of said one device is reached or exceeded, where a sum of the peak period volumes of said selected one or more plurality of registered user equipment is larger than or equal to a volume of traffic that is in excess of said on-set threshold, or in excess of an off-set threshold of said one device; and
means for sending a request for said selected one or more plurality of registered user equipment to be re-registered to at least another one device of said plurality of devices in accordance with said capacity data received from said plurality of devices.

18. The apparatus of claim 17, wherein each of said plurality of devices performs an Serving-Call Session Control Function (S-CSCF).

19. The apparatus of claim 17, wherein said request is sent to a Home Subscriber Server (HSS).

20. The apparatus of claim 19, further comprising:
means for notifying said Home Subscriber Server immediately, when one of said one or more of said plurality of registered user equipment is idle, or after a predefined time period.

* * * * *